United States Patent
Tamura (10) Patent No.: US 9,284,997 B2
(45) Date of Patent: Mar. 15, 2016

(54) ONE-WAY CLUTCH AND DRIVING DEVICE HAVING THE SAME

(71) Applicant: KYOCERA Document Solutions Inc., Osaka-shi, Osaka (JP)

(72) Inventor: Yuki Tamura, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/303,528

(22) Filed: Jun. 12, 2014

(65) Prior Publication Data

US 2014/0374212 A1    Dec. 25, 2014

(30) Foreign Application Priority Data

Jun. 24, 2013   (JP) ................. 2013-131779

(51) Int. Cl.
| | |
|---|---|
| *F16D 41/32* | (2006.01) |
| *F16D 41/36* | (2006.01) |
| *F16H 3/08* | (2006.01) |
| *F16D 41/00* | (2006.01) |

(52) U.S. Cl.
CPC .............. *F16D 41/00* (2013.01); *F16D 41/32* (2013.01); *F16D 41/36* (2013.01); *F16H 3/08* (2013.01)

(58) Field of Classification Search
None
See application file for complete search history.

(56) References Cited

U.S. PATENT DOCUMENTS

| | | | |
|---|---|---|---|
| 2,007,442 A | 7/1935 | Dodge | |
| 2,254,195 A | 8/1941 | Cicin | |
| 4,261,452 A * | 4/1981 | Barrows | 192/42 |
| 5,090,521 A * | 2/1992 | Miura | F16D 35/00 16/277 |
| 5,632,364 A * | 5/1997 | Mercat | 192/64 |
| 5,964,332 A * | 10/1999 | King | 192/64 |
| 2004/0103732 A1 | 6/2004 | Jinbo | |
| 2005/0241902 A1 | 11/2005 | Cha | |
| 2012/0125729 A1* | 5/2012 | Jimbo | 192/46 |
| 2014/0083809 A1 | 3/2014 | Shimozaki | |

FOREIGN PATENT DOCUMENTS

| | | |
|---|---|---|
| EP | 2450588 A1 | 5/2012 |
| JP | S5322960 U | 2/1978 |
| JP | 2000075581 A | 3/2000 |
| JP | 2004176847 A | 6/2004 |
| WO | 2012157259 A1 | 11/2012 |

OTHER PUBLICATIONS

European Patent Office, Extended European Search Report Issued in Application No. 14172135.7, Nov. 30, 2015, 5 pages.

* cited by examiner

*Primary Examiner* — Ramya Burgess
*Assistant Examiner* — Mark Manley
(74) *Attorney, Agent, or Firm* — Alleman Hall McCoy Russell & Tuttle LLP (57) ABSTRACT

A one-way clutch includes a first rotation member, a second rotation member, a support shaft, and a transmission member. The support shaft is disposed in a protruding manner from a first lateral surface portion of the first rotation member toward an interior space in the axial direction of a rotational shaft. The transmission member is supported by the support shaft, and can move in a sliding manner in the axial direction between a first position at which a rotational driving force in a first direction inputted to the first rotation member is transmitted to the second rotation member, and a second position at which a rotational driving force in the second direction inputted to the first rotation member is restricted from being transmitted to the second rotation member.

8 Claims, 9 Drawing Sheets

ONE-WAY CLUTCH AND DRIVING DEVICE HAVING THE SAME

INCORPORATION BY REFERENCE

This application is based upon and claims the benefit of priority from the corresponding Japanese Patent Application No. 2013-131779 filed on Jun. 24, 2013, the entire contents of which are incorporated herein by reference.

BACKGROUND

The present disclosure relates to a one-way clutch and a driving device including the one-way clutch.

As a pertinent art, a one-way clutch for transmitting a rotational driving force to a single rotational direction is known. In the pertinent art, the one-way clutch has a gear shape, is rotatably supported by a drive shaft, and transmits rotation to the drive shaft in one direction. For the purpose of preventing rotation to the other direction, a spring and a roller are disposed inside the one-way clutch. When the one-way clutch rotates in the one direction, the spring is compressed and the roller becomes rotatable with respect to the drive shaft. As a result, the rotational driving force is transmitted to the drive shaft. On the other hand, if the one-way clutch rotates in the other direction, the spring is stretched, and the roller becomes pinched between the drive shaft and an inner circumference portion of the one-way clutch. As a result, the rotation of the roller is stopped, and the rotational driving force is restricted from being transmitted.

SUMMARY

A one-way clutch according to one aspect of the present disclosure includes a first rotation member, a second rotation member, a support shaft, and a transmission member. The first rotation member has a cylindrical shape, and is a rotation member that is rotatable about a rotational shaft in a first direction and in a second direction that is counter to the first direction. The first rotation member includes an outer circumferential portion having gear teeth to which a rotational driving force is inputted from outside, an interior space formed inward in a diameter direction of the outer circumferential portion, a first lateral surface portion that is a lateral surface at one end side of the rotation member in an axial direction of the rotational shaft, and a second lateral surface portion that is a lateral surface at the other end side of the rotation member in the axial direction and has an opening portion providing an external opening for the interior space. The second rotation member has a disk shape, is mounted on the second lateral surface portion of the first rotation member, is a rotation member rotatable in an integral manner with the rotational shaft, and includes a pivotal supporting portion that is inserted in the interior space to pivotally support the rotational shaft. The support shaft is disposed in a protruding manner from the first lateral surface portion of the first rotation member toward the interior space in the axial direction of the rotational shaft. The transmission member is supported by the support shaft, and can move in a sliding manner in the axial direction between a first position at which a rotational driving force in the first direction inputted to the first rotation member is transmitted to the second rotation member, and a second position at which a rotational driving force in the second direction inputted to the first rotation member is restricted from being transmitted to the second rotation member.

A driving device according to another aspect of the present disclosure includes the one-way clutch, the rotational shaft pivotally supported by the pivotal supporting portion, and a driving portion configured to generate a rotational driving force that is to be inputted to the gear teeth.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In the following, an embodiment of the present disclosure will be described in detail with reference to the drawings. Here, although an image forming apparatus 1 having a printer function and a copying function is illustrated as one example of a driving device, the driving device may be an image forming apparatus including a printer, a copying machine, a facsimile device, and the like.

<Description of Image Forming Apparatus>

Figure 1:
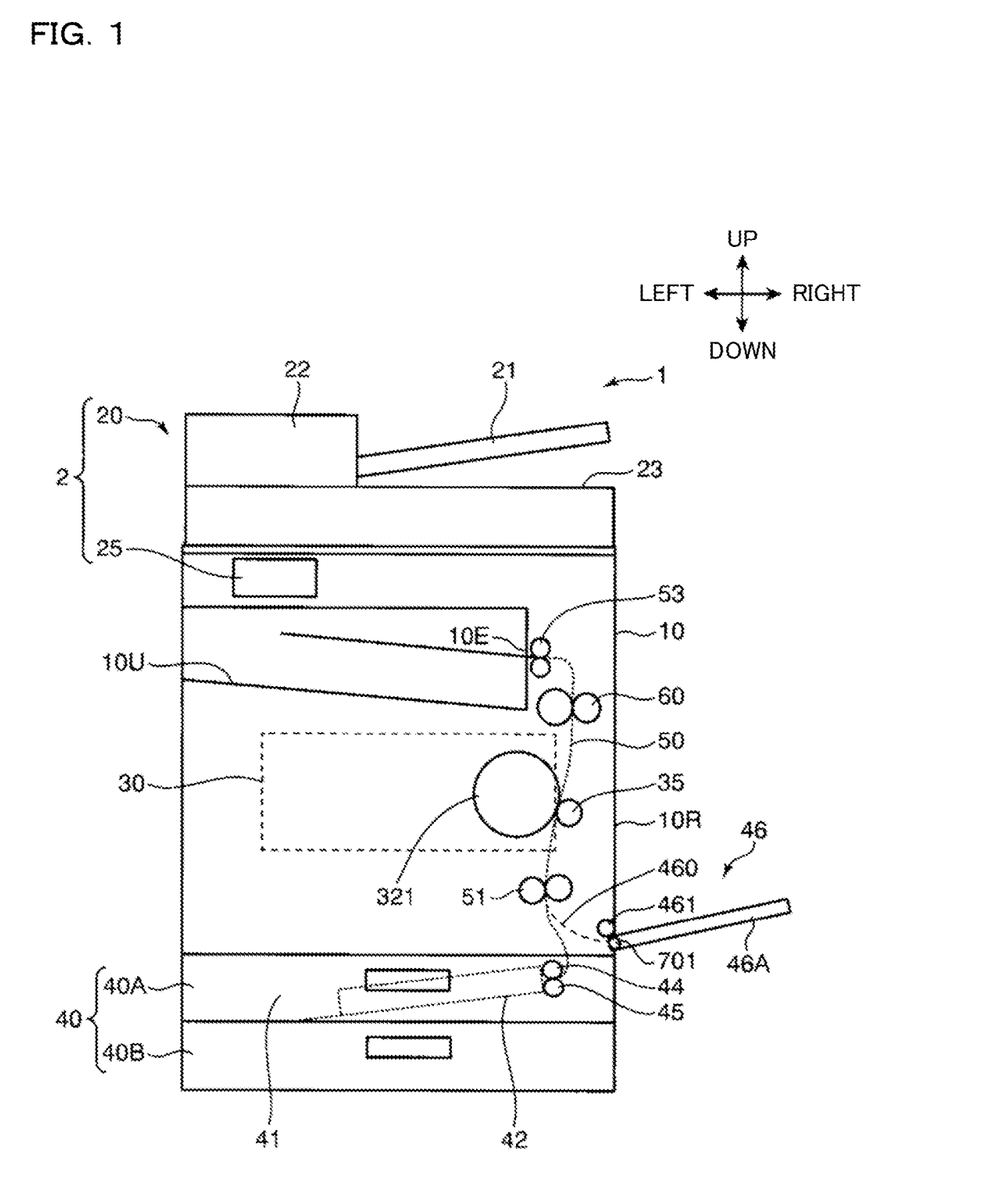
FIG. 1 is a schematic cross sectional view showing a structure of an image forming apparatus according to an embodiment of the present disclosure.
Figure 2A:
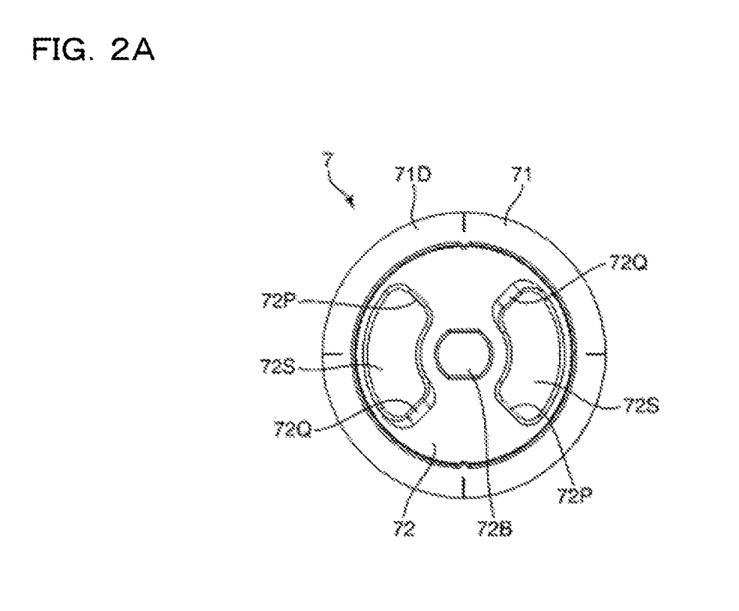
FIG. 2A is a front view of a one-way clutch according to the embodiment of the present disclosure.
Figure 2B:
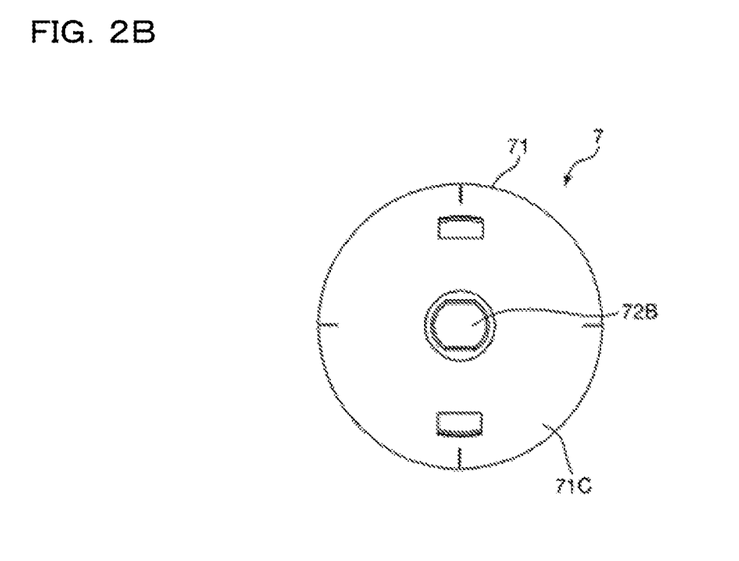
FIG. 2B is a rear view of the one-way clutch according to the embodiment of the present disclosure.

The image forming apparatus 1 includes a device main body 10 having a case structure with an approximately rectangular parallelepiped shape, and an automatic document sheet-feeding device 20 disposed on the device main body 10.

In the device main body 10, a reading unit 25, an image forming portion 30, a fixing portion 60, a sheet feeding portion 40, and a conveying route 50 are housed. The reading unit 25 optically reads an image of a document sheet that is to be copied. The image forming portion 30 forms a toner image on a sheet. The fixing portion 60 fixes the toner image on the sheet. The sheet feeding portion 40 is where sheets that are to be conveyed to the image forming portion 30 are stored. The conveying route 50 conveys a sheet from the sheet feeding portion 40 or a manual sheet feed portion 46 to a sheet discharge outlet 10E via the image forming portion 30 and the fixing portion 60. The device main body 10 has a right lateral surface 10R. The right lateral surface 10R is a lateral wall on the right side of the device main body 10.

An automatic document sheet-feeding device (ADF) 20 is rotatably attached to the top surface of the device main body 10. The ADF 20 automatically feeds a document sheet that is to be copied toward a predetermined document sheet-reading position in the device main body 10. On the other hand, the ADF 20 is opened upward when a user places a document sheet with his/her hand to the predetermined document sheet-reading position. The ADF 20 includes a document sheet tray 21 on which document sheets are placed, a document sheet-conveying portion 22 configured to convey a document sheet via the document sheet-reading position, and a document sheet-discharging tray 23 to which the document sheet is discharged after being read.

On the top surface of the device main body 10, a contact glass for reading a document sheet automatically fed by the ADF 20, or a contact glass (not shown) for reading a document sheet that has been hand-placed is disposed. The reading unit 25 optically reads an image of a document sheet through these contact glasses. It should be noted that an image reading apparatus 2 is formed from the automatic document sheet-feeding device (ADF) 20 and the reading unit 25.

The image forming portion 30 performs a process of generating a toner image and transferring the toner image onto a sheet based on an electrophotographic method known in the art. In another embodiment, other image formation methods such as an ink-jet method may be used.

The image forming portion 30 includes a photoconductor drum 321, and devices that are disposed around the photoconductor drum 321 and are not shown such as a charger, an exposure device, a developing device, and a cleaning device.

The photoconductor drum 321 rotates about its axis to form a toner image and an electrostatic latent image on the circumferential surface thereof. The charger uniformly charges the surface of the photoconductor drum 321. The exposure device includes optical devices such as a laser light source, a mirror, and a lens, and irradiates light on the circumferential surface of the photoconductor drum 321 based on the image data of the document sheet image to form an electrostatic latent image. The developing device supplies a toner to the circumferential surface of the photoconductor drum 321 for developing the electrostatic latent image formed on the photoconductor drum 321. The cleaning device includes a cleaning roller and the like, and cleans the circumferential surface of the photoconductor drum 321 after transferring the toner image.

A transfer roller 35 is disposed so as to face the photoconductor drum 321. The toner image on the photoconductor drum 321 is transferred onto the sheet at a transfer nip portion between the photoconductor drum 321 and the transfer roller 35. A secondary transfer bias potential having a polarity opposite to that of the toner image is applied on the transfer roller 35.

The sheet feeding portion 40 includes two cassettes, i.e., a first sheet feed cassette 40A and a second sheet feed cassette 40B, arranged one above the other for housing fixed-form sheets among sheets on which an image formation process is to be performed. These sheet feed cassettes can be pulled out toward the near side from the front of the device main body 10.

The first sheet feed cassette 40A includes a sheet storage portion 41 configured to store a bundle of stacked fixed-form sheets, and a lifting plate 42 configured to lift up the sheet bundle to be fed. A pickup roller that is not shown, and a roller pair of a sheet feed roll 44 and a retard roller 45 are disposed on the upper portion of the right end side of the first sheet feed cassette 40A. A sheet at the very top of the sheet bundle in the first sheet feed cassette 40A is sent out one by one through driving by the pickup roller and the sheet feed roll 44, and is transported to the upstream end of the conveying route 50. It should be noted that the second sheet feed cassette 40B also has a configuration similar to the first sheet feed cassette 40A.

The manual sheet feed portion 46 is disposed on the right lateral surface 10R of the device main body 10. The manual sheet feed portion 46 includes a manual feed tray 46A for manually feeding a sheet, and a sheet feed roller 461. The manual feed tray 46A is attached with respect to the device main body 10 in an openable and closable manner utilizing, as a fulcrum point, a fulcrum portion 701 disposed on the lower end portion of the manual feed tray 46A. A user, when manually feeding a sheet, opens the manual feed tray 46A as diagrammatically represented, and places a sheet thereon. The sheet feed roller 461 is rotationally driven by a driving portion that is not shown, and sends out the sheet to a manually-fed-sheet conveying path 460. In addition, the sheet is transported to the conveying route 50 from the manually-fed-sheet conveying path 460.

The conveying route 50 is extendedly installed from the sheet feeding portion 40 to the sheet discharge outlet 10E through the image forming portion 30 and the fixing portion 60. A registration roller pair 51 is disposed on the upstream side of the transfer nip portion in the conveying route 50. The sheet is temporarily stopped at the registration roller pair 51 that is in a stopped state, and skew correction is performed on the sheet. Then, at a predetermined timing for image transfer, the sheet is sent out to the transfer nip portion when the registration roller pair 51 is rotationally driven by a driving portion (figure omitted). In addition, multiple sheet-conveying rollers, which are not shown, are disposed on the conveying route 50 for conveying a sheet.

A paper discharge roller 53 (rotational body) for conveying a sheet is disposed at the most downstream end of the conveying route 50. The paper discharge roller 53 discharges a sheet from the sheet discharge outlet 10E. A sheet discharged from the sheet discharge outlet 10E is discharged to a sheet discharge portion 10U to be piled.

The fixing portion 60 performs a fixing process of fixing a toner image onto a sheet. A pressure roller is pressed against a fixing roller that is not shown to form a fixation nip portion. When a sheet passes through the fixation nip portion, the toner image transferred onto the sheet is fixed on the sheet.

<One-Way Clutch and Driving Device>

Next, with reference to FIGS. 2 to 6, a one-way gear 7 (one-way clutch) and a driving unit 5A including the one-way gear 7 according to the present embodiment will be described in detail.

The image forming apparatus 1 includes the driving unit 5A. The driving unit 5A rotationally drives the aforementioned paper discharge roller 53 (rotational body). As a result, the paper discharge roller 53 conveys a sheet and discharges it to the sheet discharge portion 10U. The driving unit 5A includes a motor 500 (driving portion), a rotational shaft 501 (rotational shaft), and the one-way gear 7.

The motor 500 (FIG. 3A) generates a rotational driving force that is to be inputted to the one-way gear 7. In detail, the rotational driving force generated by the motor 500 is inputted to an outer-circumference gear portion 71A of the one-way gear 7 described later. The motor 500 is configured to be rotatable in the forward and backward directions.

The rotational shaft 501 becomes the rotational axis in the rotation of the one-way gear 7. The rotational shaft 501 is pivotally supported by a shaft insertion portion 72B of the one-way gear 7 described later. In the present embodiment, the rotational shaft 501 is made from a resin material. Thus, transmission of the rotational driving force to the paper discharge roller 53 is achieved at a low cost. It should be noted that the paper discharge roller 53 is pivotally supported on the axis of the rotational shaft 501.

The one-way gear 7 transmits the rotational driving force generated by the motor 500 to the paper discharge roller 53 via the rotational shaft 501. The one-way gear 7, when being rotated in a first direction (cf. an arrow D1 in FIG. 7A) by the motor 500, transmits the rotational driving force to the rotational shaft 501. On the other hand, the one-way gear 7, when being rotated in a second direction (cf. an arrow D2 in FIG. 7A) counter to the first direction by the motor 500, slips without transmitting the rotational driving force to the rotational shaft 501. As a result, the paper discharge roller 53 is rotatable only in a direction for discharging a sheet to the sheet discharge portion 10U and is prevented from rotating in reverse.

The one-way gear 7 includes a first gear portion 71 (first rotation member), a second gear portion 72 (second rotation member), and transmission gears 73 (transmission member).

The first gear portion 71 has a cylindrical shape, and is a rotation member that is rotatable about the rotational shaft 501. In the present embodiment the first gear portion 71 is made from a resin material. The first gear portion 71 includes the outer-circumference gear portion 71A (outer circumferential portion), a hole 71B, a first lateral surface portion 71C, a second lateral surface portion 71D, and an interior space 71S. The first gear portion 71 includes support shafts 71R and a claw portion 71T.

The outer-circumference gear portion 71A is the outer circumferential part of the first gear portion 71 that has a cylindrical shape. The outer-circumference gear portion 71A includes gear teeth, which are not shown, to which the rotational driving force from the motor 500 located outside is inputted. In the present embodiment, a spur gear, which is not shown, is formed on the outer-circumference gear portion 71A.

The interior space 71S is a space formed inward in the diameter direction of the outer-circumference gear portion 71A in the first gear portion 71. The interior space 71S is a hollow part of the first gear portion 71 having a cylindrical shape. The interior space 71S is partially open to outside by an opening portion 71D1 described later.

The first lateral surface portion 71C is a lateral surface located at one end side of the first gear portion 71 in the axial direction of the rotational shaft 501. The hole 71B is a circular-shaped hole formed by penetrating the first lateral surface portion 71C at the central part of the first lateral surface portion 71C in the axial direction. The shaft insertion portion 72B of the second gear portion 72 described later is mounted in the hole 71B.

Figure 4:
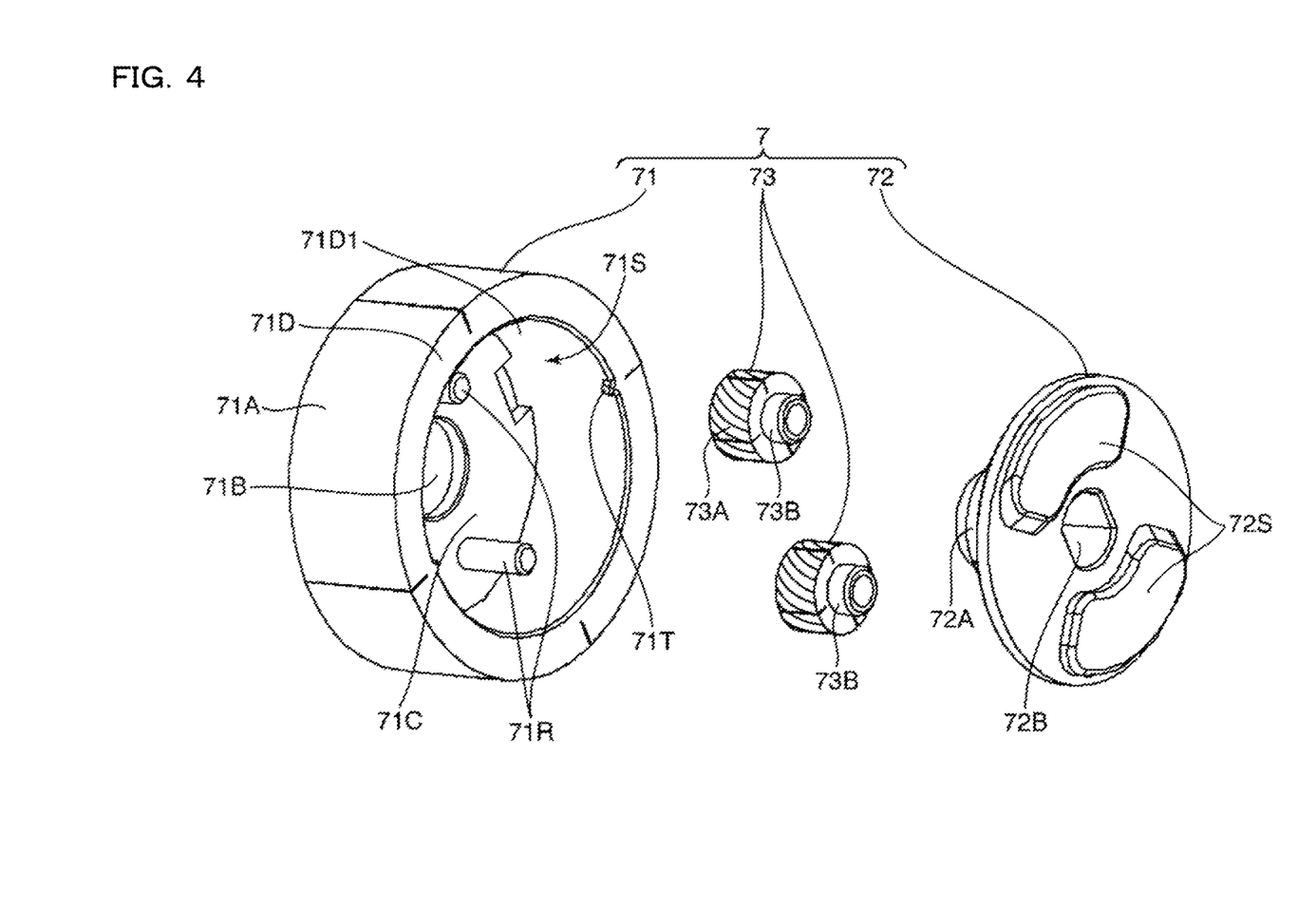
FIG. 4 is an exploded perspective view of the one-way clutch according to the embodiment of the present disclosure.

The second lateral surface portion 71D is a lateral surface at the other end side of the first gear portion 71 in the axial direction of the rotational shaft 501. In other words, the second lateral surface portion 71D is a lateral surface on the opposite side of the first lateral surface portion 71C. The second lateral surface portion 71D includes the opening portion 71D1. The opening portion 71D1 is an opening portion obtained by opening the central part of the second lateral surface portion 71D in a circular shape. The second lateral surface portion 71D provides an external opening to the interior space 71S. Thus, the other end side of the interior space 71S in the axial direction is open to the outside. As shown in FIG. 4, the opening portion 71D1 is open with a slightly smaller diameter than the outer edge portion of the second lateral surface portion 71D. Thus, the second lateral surface portion 71D is a lateral surface formed in a ring shape as shown in FIG. 4.

The support shafts 71R (FIG. 4) are each disposed between the hole 71B (the rotational shaft 501) and the outer-circumference gear portion 71A in the diameter direction for the rotation about the rotational shaft 501. The support shafts 71R are shaft portions disposed in a protruding manner in the axial direction of the rotational shaft 501 from the inner wall surface of the first lateral surface portion 71C of the first gear portion 71 toward the interior space 71S. As shown in FIG. 4, the support shafts 71R are disposed across the hole 71B as a pair. The support shafts 71R rotatably support the transmission gears 73 described later.

The claw portion 71T is a protruded piece disposed in a protruding manner from the second lateral surface portion 71D of the first gear portion 71 toward the inner side in the diameter direction so as to enter the opening portion 71D1. When the second gear portion 72, which is described later, is mounted on the first gear portion 71, the claw portion 71T locks the outer peripheral edge of the second gear portion 72. The first gear portion 71 and the second gear portion 72 are bound in a simple manner by the claw portion 71T. Thus, the one-way gear 7 is provided as an assembly with a simple configuration.

The second gear portion 72 is a rotation member having a disk shape. The second gear portion 72 is mounted on the second lateral surface portion 71D of the first gear portion 71. In detail, the second gear portion 72 is mounted on the second lateral surface portion 71D so as to close the opening portion 71D1 of the second lateral surface portion 71D. The second gear portion 72 can rotate integrally with the rotational shaft 501. In the present embodiment, the second gear portion 72 is made from a resin material. The second gear portion 72 includes a pivotal supporting portion 72A, the shaft insertion portion 72B, and concaved portions 72S.

Figure 3A:
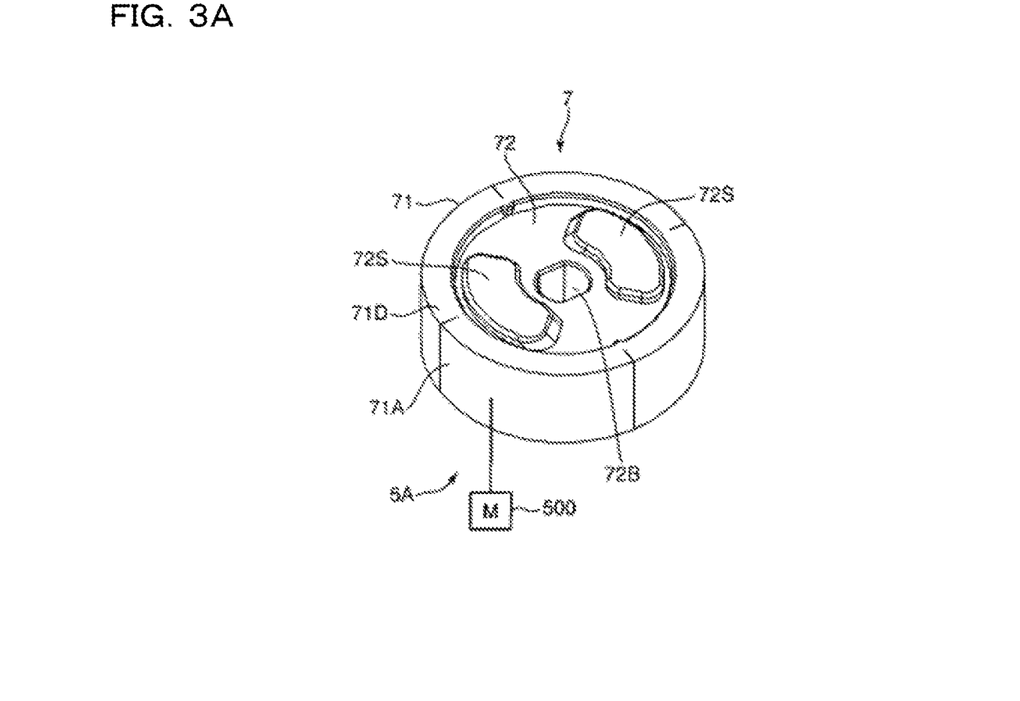
FIGS. 3A and 3B are perspective views of a driving device including the one-way clutch according to the embodiment of the present disclosure.
Figure 3B:
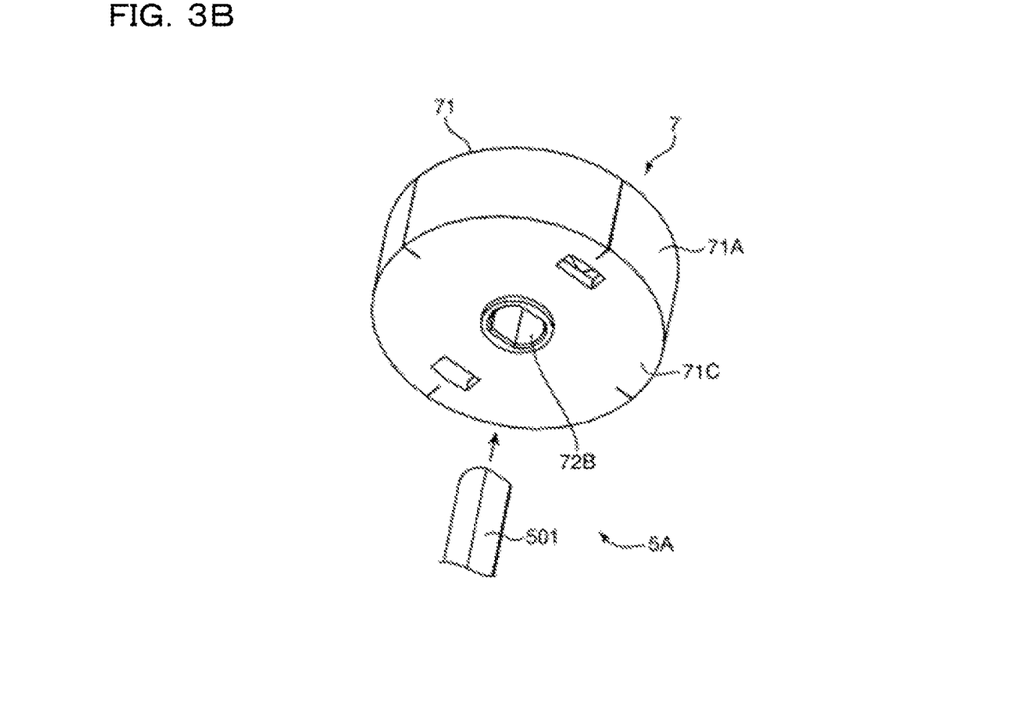

The pivotal supporting portion 72A is a cylindrical portion disposed in a protruding manner from the central part of the second gear portion 72. When the second gear portion 72 is mounted on the first gear portion 71, the pivotal supporting portion 72A becomes inserted in the interior space 71S. The pivotal supporting portion 72A pivotally supports the rotational shaft 501. In detail, the shaft insertion portion 72B having a hollow shape is formed inside the pivotal supporting portion 72A. The rotational shaft 501 is inserted in the shaft insertion portion 72B. It should be noted that, as shown in FIG. 3B and FIG. 4, the shaft insertion portion 72B has a shape obtained by cutting out an inner circumference portion of the pivotal supporting portion 72A in a shape of one pair of D-shaped surfaces. In a manner corresponding to the shape, the outer circumferential portion of the rotational shaft 501 (FIG. 3B) is cut in a shape of one pair of D-shaped surfaces. As a result, when the rotational shaft 501 is inserted in the shaft insertion portion 72B, the rotational shaft 501 and the second gear portion 72 can rotate integrally.

The pivotal supporting portion 72A includes a guidance helical portion 72A1 (second helical teeth), and an insertion projecting portion 72A2. The guidance helical portion 72A1 is a helical gear part disposed in a tilted manner with respect to the axial direction on the circumferential surface of the pivotal supporting portion 72A. The guidance helical portion 72A1 becomes intermeshed with transmission helical portions 73A of the transmission gears 73 described later. The insertion projecting portion 72A2 is a part where the outer diameter is partially small at the front end portion of the pivotal supporting portion 72A. It should be noted that a helical gear as in the case with the guidance helical portion 72A1 is not formed on the insertion projecting portion 72A2. When the second gear portion 72 is mounted on the first gear portion 71, the insertion projecting portion 72A2 is inserted in the hole 71B. The second gear portion 72 including the insertion projecting portion 72A2 is pivotally supported by the hole 71B in a rotatable manner.

The concaved portions 72S are formed by partially concaving the second gear portion 72 in a disc shape. The concaved portions 72S are arranged across the pivotal supporting portion 72A as a pair. The concaved portions 72S are disposed so as to face the transmission gears 73, which are described later, in the axial direction. The transmission gears 73 are insertable to the concaved portions 72S. The concaved portions 72S are concaved in circular arc shapes along a circumferential direction with a predetermined width in a diameter direction regarding rotation of the second gear portion 72. The concaved portions 72S include transmission-engaging portions 72P (first wall portions) and tapered portions 72Q (second wall portions).

The transmission-engaging portions 72P are wall portions disposed at an end part of the concaved portions 72S on the downstream side in the first direction. The transmission-engaging portions 72P are disposed so as to stand along the axial direction of the rotational shaft 501. In other words, the transmission-engaging portions 72P are disposed so as to stand along the axial direction of the support shafts 71R (cf. FIGS. 8A and 8B).

The tapered portions 72Q are wall portions disposed at an end part of the concaved portions 72S on the upstream side in the first direction. The tapered portions 72Q are disposed so as to stand in a manner tilted by a predetermined angle with respect to the axial direction of the rotational shaft 501. In detail, the tapered portions 72Q are disposed so as to stand in a manner tilted downward along the first direction regarding rotation of the one-way gear 7. In other words, the tapered portions 72Q are tilted such that the depth of the concavities of the concaved portions 72S become gradually larger along the first direction. The tapered portions 72Q having a tapered shape have a function of guiding the later-described transmission gears 73 in the axial direction.

Figure 5:
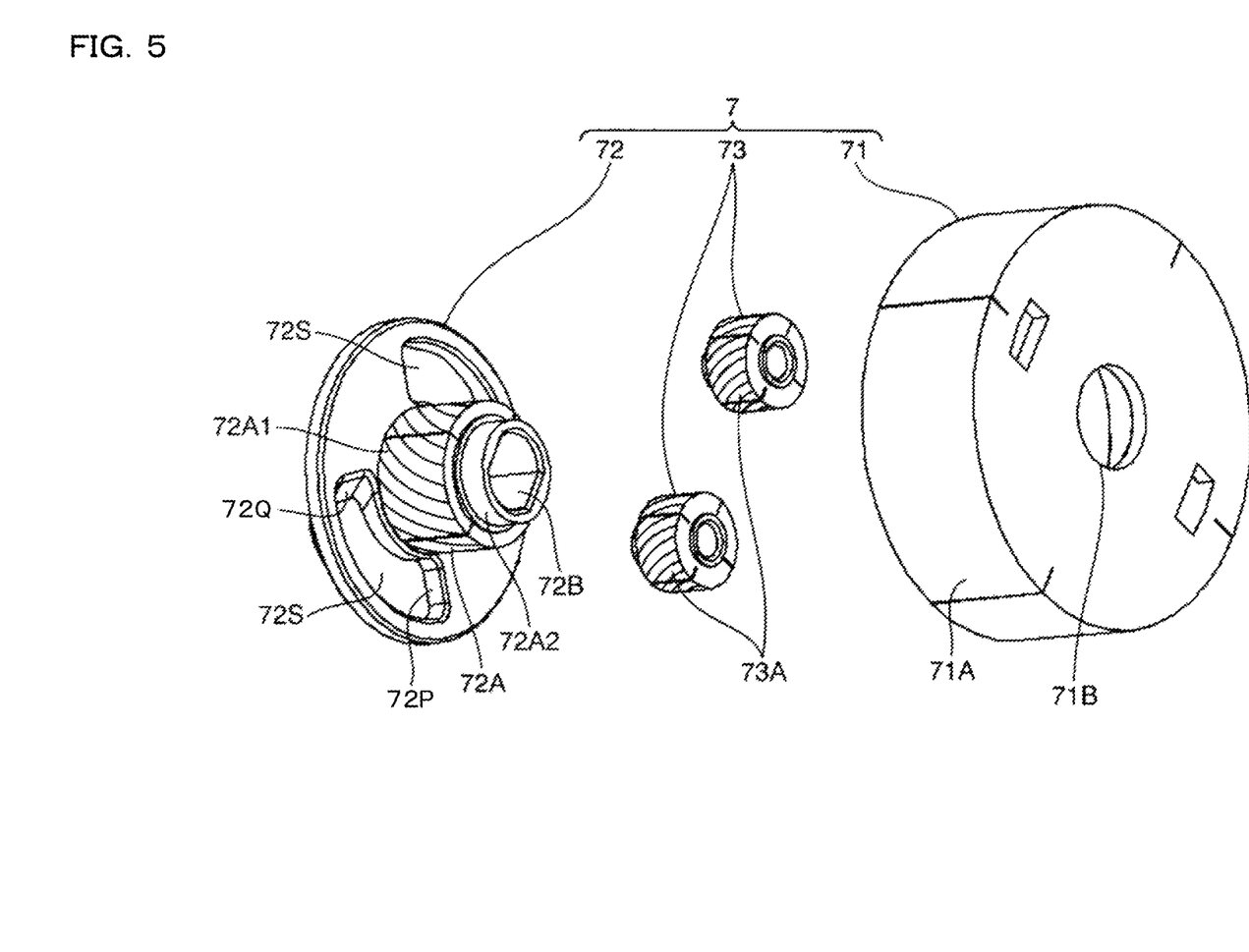
FIG. 5 is an exploded perspective view of the one-way clutch according to the embodiment of the present disclosure.
Figure 6:
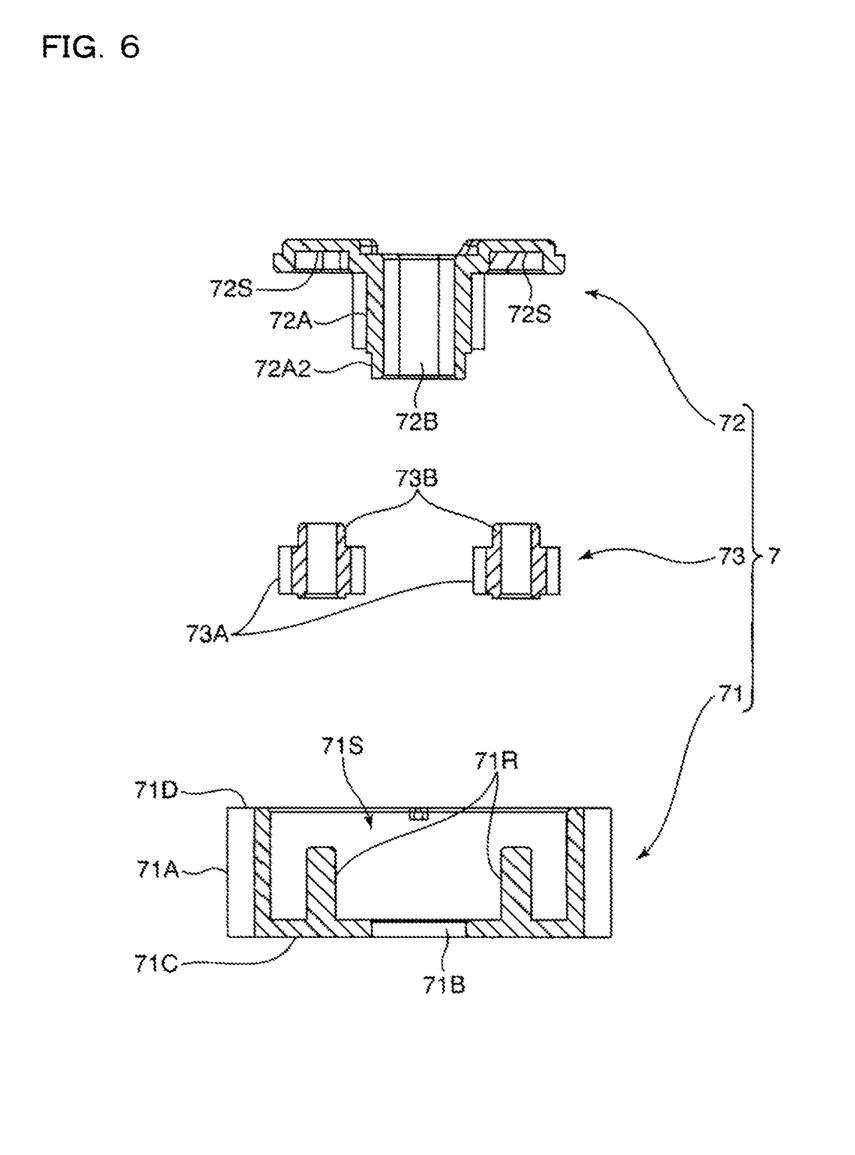
FIG. 6 is an exploded cross sectional view of the one-way clutch according to the embodiment of the present disclosure.

As shown in FIGS. 4 and 5, the transmission gears 73 are rotatably supported by the support shafts 71R. In the present embodiment, one pair of the transmission gears 73 is disposed so as to correspond with the one pair of the support shafts 71R. The transmission gears 73 have a cylindrical shape. In the present embodiment, the transmission gears 73 are made from a resin material. The transmission gears 73 include the transmission helical portions 73A (first helical teeth) and engage-protruding portions 73B (protruding portions). The transmission helical portions 73A are helical geared portions formed on the circumferential surfaces of the transmission gears 73 in a manner tilted with respect to the axial direction. When the transmission gears 73 and the second gear portion 72 are mounted on the first gear portion 71, the transmission helical portions 73A are intermeshed with the guidance helical portion 72A1 of the second gear portion 72. The engage-protruding portions 73B are disposed in a protruding manner from one of the lateral surfaces of the transmission gears 73. The engage-protruding portions 73B are disposed in a protruding manner in the axial direction with outer diameters that are smaller than the outer diameters of the transmission gears 73. The engage-protruding portions 73B can be inserted in the concaved portions 72S of the second gear portion 72.

The transmission gears 73 can move in a sliding manner in the axial direction with respect to the support shafts 71R. In detail, the transmission gears 73 can move in a sliding manner between a first position P1 (cf. FIG. 7B) at which a rotational driving force in the first direction inputted to the first gear portion 71 from the outer-circumference gear portion 71A in the axial direction is transmitted to the second gear portion 72, and a second position P2 (cf. FIG. 7C) at which a rotational driving force in the second direction inputted to the first gear portion 71 is restricted from being transmitted to the second gear portion 72.

In addition, the transmission gears 73, when being engaged with the transmission-engaging portions 72P of the concaved portions 72S at the first position P1, are rotated integrally with the first gear portion 71 and the second gear portion 72. Furthermore, the transmission gears 73 are disposed at the second position P2 when being detached from the concaved portions 72S toward a side of the first lateral surface portion 71C in the axial direction of the rotational shaft 501. At the second position P2, the transmission gears 73 cause the first gear portion 71 to slip with respect to the second gear portion 72.

Figure 7A:
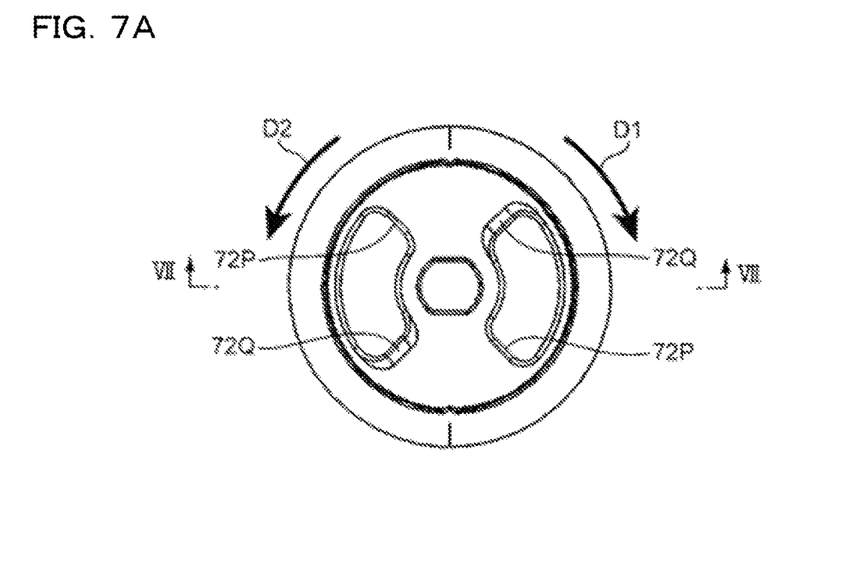
FIG. 7A is a front view of the one-way clutch according to the embodiment of the present disclosure.
Figure 7B:
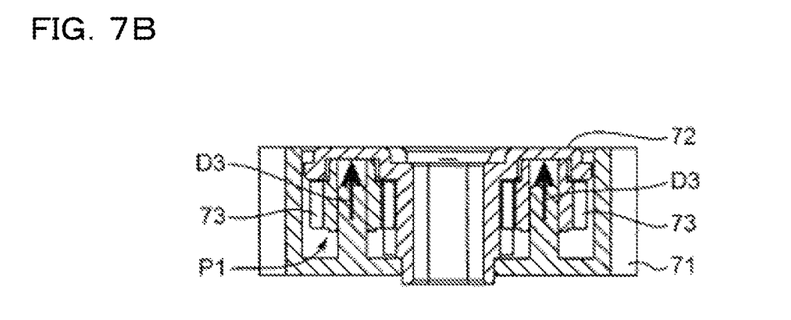
FIG. 7B is a cross sectional view of the one-way clutch according to the embodiment of the present disclosure, in a state where a transmission member is disposed in a first position.
Figure 7C:
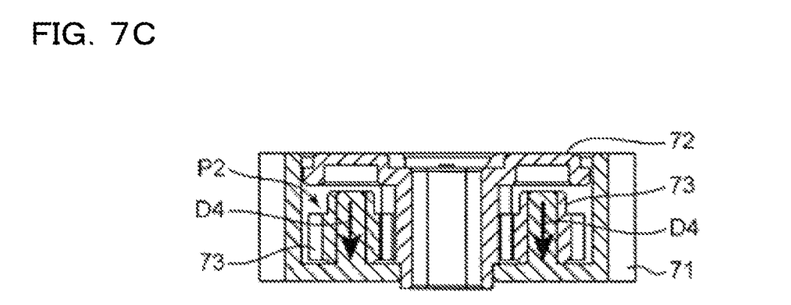
FIG. 7C is a cross sectional view of the one-way clutch according to the embodiment of the present disclosure, in a state where the transmission member is disposed in a second position.
Figure 8A:
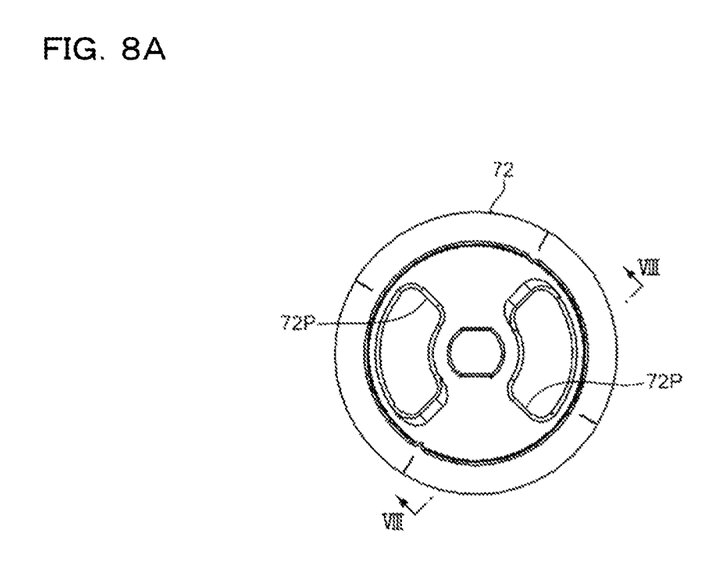
FIG. 8A is a front view of the one-way clutch according to the embodiment of the present disclosure.
Figure 8B:
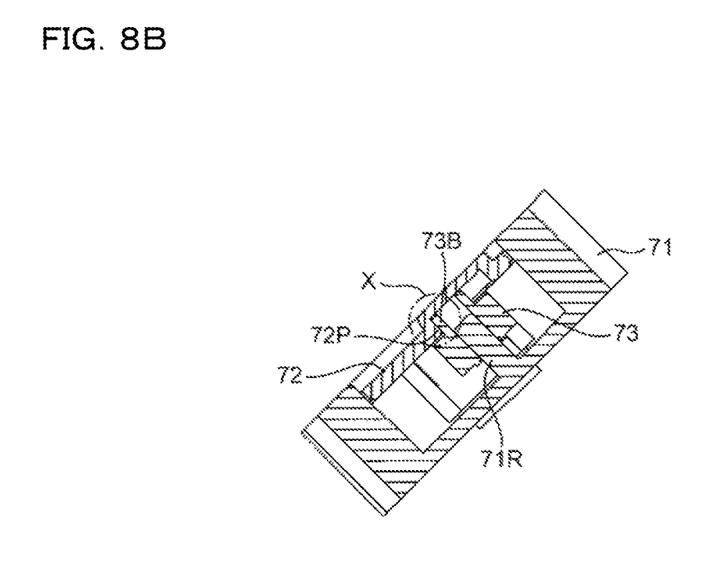
FIG. 8B is a cross sectional view of the one-way clutch according to the embodiment of the present disclosure, in a state where the transmission member is disposed in the first position.
Figure 9A:
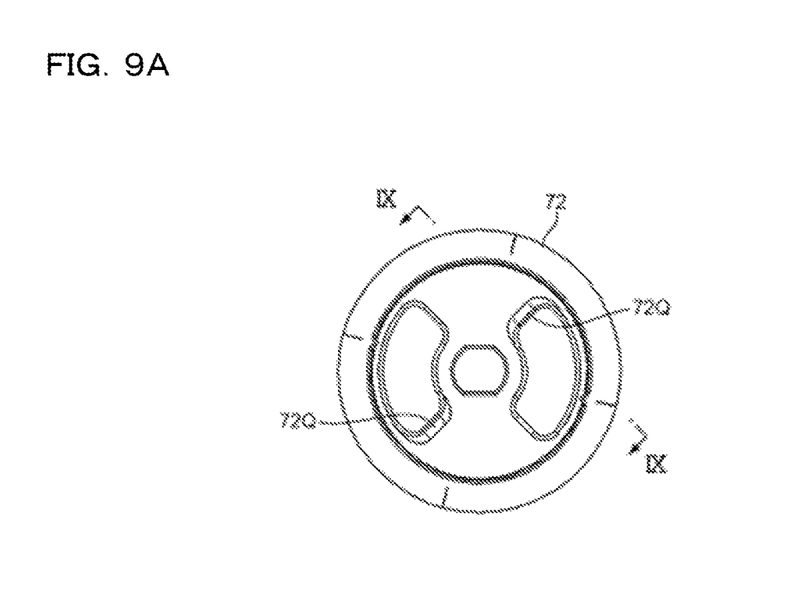
FIG. 9A is a front view of the one-way clutch according to the embodiment of the present disclosure.
Figure 9B:
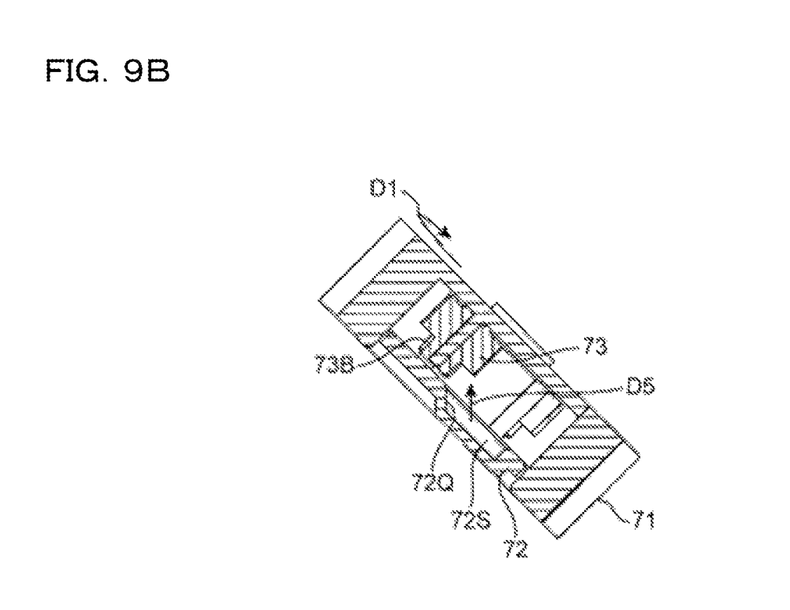
FIG. 9B is a cross sectional view of a state in which the transmission member according to the embodiment of the present disclosure is disposed in the second position.

Next, with reference to FIGS. 7 to 9, the action of the one-way gear 7 will be described. FIGS. 7B and 7C correspond to cross sectional views at a section part VII in FIG. 7A. FIG. 8B corresponds to a cross sectional view at a section part VIII in FIG. 8A. FIG. 9B corresponds to a cross sectional view at section part IX in FIG. 9A.

When the motor 500 (FIG. 3A) rotates in the regular direction, the rotational driving force is inputted to the outer-circumference gear portion 71A, and the first gear portion 71 is rotated in the first direction (arrow D1 direction in FIG. 7A) about the rotational shaft 501. In this case, the transmission gears 73 that are pivotally supported by the support shafts 71R rotate in the first direction by the first gear portion 71. Simultaneously, the transmission gears 73 move in a sliding manner toward a side of the second gear portion 72 (arrow D3 direction in FIG. 7B) along the support shafts 71R, since the transmission helical portions 73A and the guidance helical portion 72A1 are intermeshed. As the engage-protruding portions 73B of the transmission gears 73 enter the concaved portions 72S of the second gear portion 72, the engage-protruding portions 73B can engage the transmission-engaging portions 72P of the concaved portions 72S. As a result, the transmission gears 73 become disposed at the first position P1. As shown in FIG. 8B, the transmission-engaging portions 72P are extendedly installed along the axial direction. When the circumferential surfaces of the engage-protruding portions 73B which are similarly extendedly installed along the axial direction make contact with the transmission-engaging portions 72P, the rotational driving force is transmitted with certainty along the circumferential direction from the first gear portion 71 to the second gear portion 72 via the transmission gears 73. Then, the rotational driving force is transmitted to the rotational shaft 501 that is rotatable with the second gear portion 72 in an integral manner to rotate the paper discharge roller 53 (FIG. 1) stably.

On the other hand, when the motor 500 (FIG. 3A) rotates in reverse, the rotational driving force is inputted to the outer-circumference gear portion 71A, and the first gear portion 71 is rotated in the second direction (arrow D2 direction in FIG. 7A) about the rotational shaft 501. In this case, the transmission gears 73 that are pivotally supported by the support shafts 71R rotate in the second direction by the first gear portion 71. Simultaneously, the transmission gears 73 move in a sliding manner toward a side of the first lateral surface portion 71C (arrow D4 direction in FIG. 7C) of the first gear portion 71 along the support shafts 71R, since the transmission helical portions 73A and the guidance helical portion 72A1 are intermeshed. In this case, as described above, the tapered portions 72Q are disposed on the upstream side in the first direction of the concaved portions 72S, i.e., at the end portion of the downstream side in the second direction. As shown in FIG. 9B, the tapered portions 72Q are disposed so as to stand in a manner tilted downward along the first direction. Therefore, associated with the rotation of the first gear portion 71 in the second direction, the engage-protruding portions 73B of the transmission gears 73 move in a sliding manner while being detached from the concaved portions 72S along the tapered portions 72Q. Thus, the tapered portions 72Q have a guide function of guiding the detachment of the engage-protruding portions 73B from the concaved portions 72S. As a result, the transmission gears 73 become disposed at the second position P2. Since the transmission gears 73 and the concaved portions 72S are not engaged, the rotational driving force of the first gear portion 71 is not transmitted to the second gear portion 72. Thus, the first gear portion 71 slips with respect to the second gear portion 72, and the rotational shaft 501 that is pivotally supported by the second gear portion 72 also does not rotate. As a result, the paper discharge roller 53 is restricted from rotating in reverse.

As described above, with the present embodiment, by using the one-way gear 7 including the first gear portion 71, the second gear portion 72, and the transmission gears 73; rotation in the first direction is suitably transmitted to the rotational shaft 501 and rotation in the second direction is firmly restricted. As a result, with regard to the rotational shaft 501, rotation in the first direction is firmly achieved and rotation in the second direction is firmly restricted. In this case, since the first gear portion 71, the second gear portion 72, and the transmission gears 73 are formed from a resin material, a one-way gear is provided at a low cost when compared to a conventional one-way gear including metallic components such as a spring and a roller made from a metallic material. Since the first gear portion 71 which is the main component is made from resin, even when a screw or the like for fastening is disposed on the one-way gear 7, the one-way gear 7 can be formed at a low cost. In addition, since the rotational shaft 501 is formed from a resin material, the driving unit 5A is provided at a low cost. It should be noted that, in the present embodiment, a roller made from a metallic material does not slide on the rotational shaft as in the case with a conventional one-way clutch. Thus, the rotational shaft 501 made from a resin material can be applied as the rotational shaft as described above.

Furthermore, in the present embodiment, transmission of the rotational driving force from the first gear portion 71 to the second gear portion 72 is achieved by having the transmission gears 73 engage the concaved portions 72S. In addition, transmission of the rotational driving force from the first gear portion 71 to the second gear portion 72 is disconnected by having the transmission gears 73 detach from the concaved portions 72S. In this case, slide movement of the transmission gears 73 between the first position P1 and the second position P2 is suitably achieved through intermeshing of the helical gear disposed at the pivotal supporting portion 72A and the transmission gears 73.

As described above, in the present embodiment, a plurality of the support shafts 71R, the transmission gears 73, and the concaved portions 72S are disposed along the circumferential direction. Thus, switching of transmission of the rotational driving force between the first gear portion 71 and the second gear portion 72 is achieved stably.

Although the one-way gear 7, the image forming apparatus 1 and the driving unit 5A including the one-way gear 7 according to an embodiment of the present disclosure have been described above, the present disclosure is not limited thereto, and modifications such as, for example, that described in the following can be used.

(1) In the aforementioned embodiment, although a mode in which one pair of each of the support shafts 71R, the transmission gears 73, and the concaved portions 72S are disposed has been described, present disclosure is not limited thereto. The aforementioned components may each be disposed singly or in a group of three or more along the circumferential direction.

(2) In the aforementioned embodiment, although a mode in which the one-way gear 7 transmits the rotational driving force to the paper discharge roller 53 of the image forming apparatus 1 has been described, the present disclosure is not limited thereto. The one-way gear 7 may transmit the rotational driving force to another rotational body.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A one-way clutch comprising:
a first rotation member that has a cylindrical shape, is a rotation member that is rotatable about a rotational shaft in a first direction and a second direction counter to the first direction, and includes an outer circumferential portion having gear teeth to which a rotational driving force is inputted from outside, an interior space formed inward in a diameter direction of the outer circumferential portion, a first lateral surface portion that is a lateral surface at one end side of the rotation member in an axial direction of the rotational shaft, and a second lateral surface portion that is a lateral surface at the other end side of the rotation member in the axial direction and has an opening portion providing an external opening for the interior space;
a second rotation member that has a disk shape, is mounted on the second lateral surface portion of the first rotation member, is a rotation member rotatable in an integral manner with the rotational shaft, and includes a pivotal supporting portion inserted in the interior space to pivotally support the rotational shaft;
a support shaft that is disposed in a protruding manner from the first lateral surface portion of the first rotation member toward the interior space in the axial direction of the rotational shaft; and
a transmission member that is supported by the support shaft, and is movable in a sliding manner in the axial direction between a first position at which a rotational driving force in the first direction inputted to the first rotation member is transmitted to the second rotation member, and a second position at which a rotational driving force in the second direction inputted to the first rotation member is restricted from being transmitted to the second rotation member, wherein the second rotation member further includes a concaved portion that is formed as a partial concavity on the second rotation member so as to face the transmission member in the axial direction, and to which the transmission member is insertable;

the transmission member, when being engaged with the concaved portion at the first position, is rotated integrally with the first rotation member and the second rotation member, and, when being detached from the concaved portion toward a side of the first lateral surface portion in the axial direction, is disposed at the second position to cause the first rotation member to slip with respect to the second rotation member; and a plurality of the support shafts, the transmission members, and the concaved portions are disposed along the circumferential direction.

2. The one-way clutch according to claim 1, wherein the first rotation member, the second rotation member, and the transmission member are each made from resin.

3. The one-way clutch according to claim 1, wherein:

the transmission member has a cylindrical shape, and includes, on a circumferential surface thereof, first helical teeth formed in a tilted manner with respect to the axial direction so as to be rotatable about the support shaft;

a second helical teeth, to be intermeshed with the first helical teeth, is disposed on a circumferential surface of the pivotal supporting portion of the second rotation member in a tilted manner with respect to the axial direction; and the transmission member, when the first rotation member is rotated in the first direction, is moved in a sliding manner toward a side of the second rotation member along the support shaft to be disposed at the first position, since the first helical teeth and the second helical teeth are intermeshed, and the transmission member, when the first rotation member is rotated in the second direction, is moved in a sliding manner toward a side of the first lateral surface portion along the support shaft to be disposed at the second position, since the first helical teeth and the second helical teeth are intermeshed.

4. The one-way clutch according to claim 3, wherein:

the transmission member includes a protruding portion that is insertable to the concaved portion;

the concaved portion is concaved in a circular arc shape along a circumferential direction with a predetermined width in a diameter direction regarding rotation of the second rotation member, and includes a first wall portion disposed so as to stand along the axial direction at an end part on a downstream side in the first direction; and the rotational driving force is transmitted from the first rotation member to the second rotation member via the transmission member when the protruding portion makes contact with the first wall portion.

5. The one-way clutch according to claim 4, wherein:

the concaved portion includes a second wall portion disposed so as to stand in a manner tilted downward along the first direction at an end part on an upstream side in the first direction; and the protruding portion, when first rotation member is rotated in the second direction, is moved in a sliding manner toward a side of the first lateral surface portion along the second wall portion while being detached from the concaved portion.

6. The one-way clutch according to claim 1, further comprising a claw portion disposed in a protruding manner from the second lateral surface portion of the first rotation member toward an inner side in the diameter direction, and configured to lock the second rotation member.

7. A driving device comprising:

the one-way clutch according to claim 1;

the rotational shaft pivotally supported by the pivotal supporting portion; and a driving portion configured to generate a rotational driving force that is to be inputted to the gear teeth.

8. The driving device according to claim 7, wherein the rotational shaft is made from a resin material.

* * * * *